(12) United States Patent
Dubois et al.

(10) Patent No.: US 7,066,477 B2
(45) Date of Patent: Jun. 27, 2006

(54) TRANSPORT DOLLY

(75) Inventors: Jean-Marc Dubois, Bremgarten (CH); Boris Schwab, Villigen (CH)

(73) Assignee: George Utz Holding AG, Bremgarten (CH)

( * ) Notice: Subject to any disclaimer, the term of this patent is extended or adjusted under 35 U.S.C. 154(b) by 21 days.

(21) Appl. No.: 10/889,405

(22) Filed: Jul. 12, 2004

(65) Prior Publication Data

US 2005/0006861 A1    Jan. 13, 2005

(51) Int. Cl.
*B62B 1/00* (2006.01)
(52) U.S. Cl. .................. 280/79.11; 280/47.34; 280/166; 280/651; 280/47.36; 280/DIG. 12; 280/DIG. 18; 280/DIG. 19
(58) Field of Classification Search .......... 280/79.11, 280/47.34, 166, 651, 47.36, DIG. 12, DIG. 18, 280/DIG. 19
See application file for complete search history.

(56) References Cited

U.S. PATENT DOCUMENTS

| 4,505,495 A | * | 3/1985 | Foss et al. | ................. 280/651 |
| 4,824,129 A | * | 4/1989 | Rehrig | ................. 280/79.11 |
| 5,921,566 A | * | 7/1999 | Kern et al. | ............. 280/79.11 |
| 6,382,643 B1 | * | 5/2002 | Baker | ................. 280/79.11 |
| 6,886,787 B1 | * | 5/2005 | Stahl | ......................... 248/129 |

* cited by examiner

Primary Examiner—J. Allen Shriver
Assistant Examiner—Cynthia F. Collado
(74) Attorney, Agent, or Firm—Victor N. King; Speckman Law Group PLLC

(57) ABSTRACT

The invention provides a transport dolly for the transport of cuboid boxes and stackable transport containers in which the upper side is used as a bearing surface for the items to be transported. The transport dolly comprises a substantially rectangular support floor which is rollable on wheels and comprises anti-slip devices. An extendable additional element is provided on each of the two transverse ends of the support floor, which additional element can be flipped outwardly by 180°. The lateral extension of the additional elements produces an enlargement of the bearing surface of the support floor. Upwardly projecting stop edges are shaped on the upper edge of the two longitudinal sides of the support floor. The additional elements, which are laterally hinge-fixed to the support floor by means of bolts in recesses of the support floor, have a thickness which ensures that, when the additional elements are retracted, the recess in the support floor is filled and the upper side of the additional element forms part of the bearing surface.

11 Claims, 4 Drawing Sheets

TRANSPORT DOLLY

CROSS-REFERENCE TO RELATED APPLICATIONS

This application claims priority to Swiss patent application no. 01203/03, filed Jul. 10, 2003.

FIELD OF THE INVENTION

The invention relates to a transport dolly for moving stackable transport boxes.

BACKGROUND OF THE INVENTION

Transport dollies are used for transporting cube-shaped containers, cases or stackable transport boxes. The upper side of the transport dolly is used as the supporting surface for the item to be transported. Anti-slip strips positioned on the sides and in the center prevent any slippage of the transported item. The dimensions of the supporting surface and the arrangement of the anti-slip strips are chosen in such a way that two transport boxes can be positioned adjacent to one another without contacting each other. The transport dollies have an external dimension which is slightly larger than the external dimension of the stack of transport boxes positioned on the transport dolly. This allows compact positioning of the transport dollies with the transported items on the longitudinal and transverse side without any space next to each other.

Stackable and lockable transport boxes comprise two top cover halves which are each rigidly hinged on the longitudinal side walls of the transport boxes. When the transport dollies are arranged next to each other, these containers, which are closed with the two top cover halves, can be stacked above one another without the transport dollies touching or obstructing each other. During transport of the empty transport boxes, these boxes can be stacked into each other in a compact fashion when the top cover halves are flipped away laterally due to their conical design. When flipped away, the top cover halves are held by latching elements which are provided on the side walls of the transport box. A stack of empty, mutually stacked transport boxes is wider as a result of the top covers which are flipped downwardly on the side, than a stack of transport boxes with the top covers closed. As a result of this, two stacks of empty, mutually stacked, transport boxes cannot be placed on the supporting surface of the transport dolly.

SUMMARY OF THE INVENTION

It is therefore an object of the present invention to provide a transport dolly with a variable supporting surface which allows positioning of at least two stacks of narrower, closed, transport boxes, as well as at least two stacks of wider, open, transport boxes with top covers which are flipped downwardly on the sides. In the transport dolly of the present invention, the supporting surface of the transport dolly is enlarged by means of additional elements which can be flipped outwardly on the side when required.

More specifically, the present invention provides a transport dolly for moving at least one stackable transport box, the dolly comprising: (a) a substantially rectangular support floor having a bearing surface for receiving the transport box, the support floor being movable on wheels; (b) at least one anti-slip device positioned on the bearing surface of the support floor to prevent movement of a transport box positioned on the bearing surface; and (c) at least one extendable additional element hingeably attached to a transverse end of the support floor, wherein the additional element can be flipped outward by 180° thereby enlarging the bearing surface of the support floor. In a preferred embodiment, the inventive transport dolly comprises two extendable elements hingeably attached to opposing transverse ends of the support floor.

In one embodiment, the at least one anti-slip device is a projecting stop edge provided on an upper edge of at least one longitudinal side of the support floor. In addition, a protrusion which acts as a lateral stop edge may be provided on an upper outer edge of the additional element. In this embodiment, a recess is positioned at the center of the transverse side of the support floor, below the additional element, which corresponds in shape and size to the protrusion. This recess is able to hold the protrusion in a locked position when the additional element is in an extended, or flipped, position The support floor of the inventive transport dolly is preferably provided with at least one cuboid recess positioned at the transverse end of the dolly for receiving the additional element when it is flipped inwards. The additional element is hingeably attached to the support floor by means of at least one bolt positioned in the recess. Preferably, the thickness of the additional element corresponds to the thickness of the recess, so that, when the additional element is retracted, the recess in the support floor is filled and the upper side of the additional element forms a part of the bearing surface.

In one embodiment, the lower surface of the transport dolly of the present invention is provided with two wheels adjacent to the transverse side of the transport dolly, that are guide rollers. Each of the guide rollers has a coaster axis which extends eccentrically to a vertical axis about which the guide roller can rotate.

In a further embodiment, slot-like recesses are provided in the support floor and in the additional element, the slot-like recesses extending parallel to the longitudinal sides of the transport dolly, and being sized and shaped to receive the wheels of a second transport dolly when the second transport dolly is positioned on the support floor. Preferably, at least one of the slot-like recesses is able to hold at least one wheel of the second transport dolly in a lockable manner.

BRIEF DESCRIPTION OF THE DRAWINGS

Further advantages and embodiments of the present invention are explained in the following description with reference to the attached drawings, wherein.

The same reference numerals have been used in the figures for the same elements. The first explanation of each element shall relate to all figures, unless expressly stated otherwise.

DETAILED DESCRIPTION OF THE INVENTION

Figure 1:
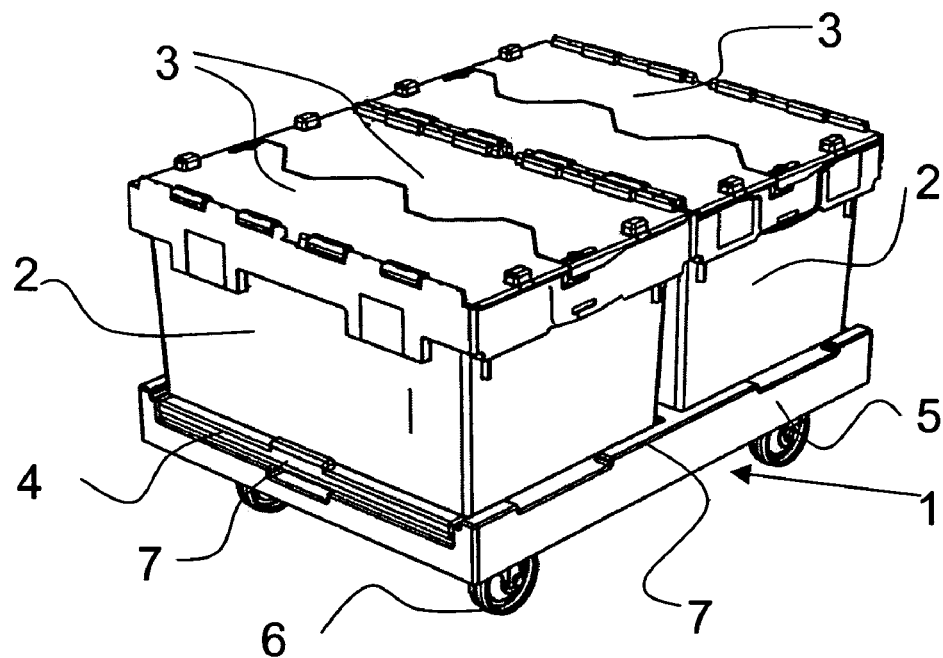
FIG. 1 shows a perspective view of a transport dolly of the present invention loaded with two transport boxes.

FIG. 1 shows a transport dolly 1 of the present invention loaded with two transport boxes 2. The transport dolly 1 comprises a rectangular support floor 5, with four wheels 6 being arranged on its lower side. Preferably, two of said four wheels 6 are guide rollers, namely a pair of wheels which is adjacent one transverse side of the transport dolly 1. However all four wheels may be guide rollers. Such guide rollers are rotatable about axes that extend eccentrically to their vertical axes. This leads to the advantage that the transport dollies 1 are easy to guide and control during their displacement. An additional element 4 is arranged on each of the two transverse ends of the support floor 5. Element 4 can be flipped outwardly by 180°. As a result of outwardly flipping the additional elements 4, the support surface for the transport boxes 2 is enlarged, as explained in detail below. Stop edges 7 are provided on the longitudinal side of the support floor 5 and on the additional elements 4. These stop edges 7 form an anti-slip means and are used for centering the transport boxes 2 positioned on the support floor 5. The illustrated transport boxes 2 are provided with top covers 3 and can thus be stacked and transported on the transport dolly 1.

Figure 2:
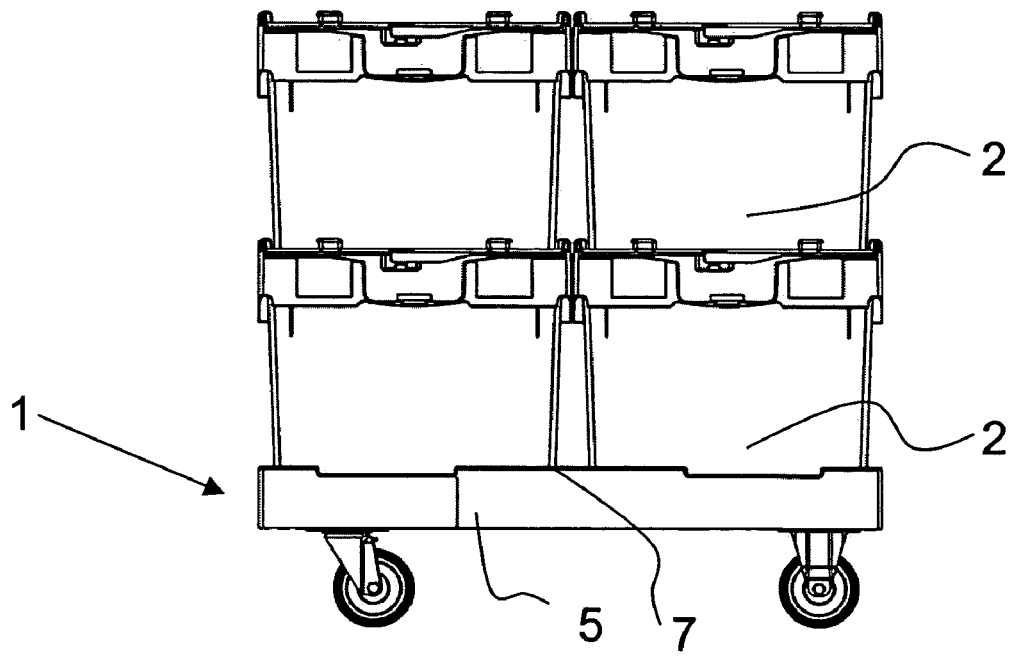
FIG. 2 shows a side view of a transport dolly of the present invention loaded with two stacks of transport boxes, in which the stacked transport boxes are closed with top covers.

FIG. 2 shows a transport dolly 1 of the present invention loaded with two stacks of transport boxes 2. The positioning space delimited by the stop edges 7 on the upper side of the support floor 5 is sized to enable the positioning of the two stacks adjacent to one another. The stop edges 7 prevent any slippage of the transport boxes 2 on the support floor 5 during movement or displacement of the transport dolly 1.

Figure 3:
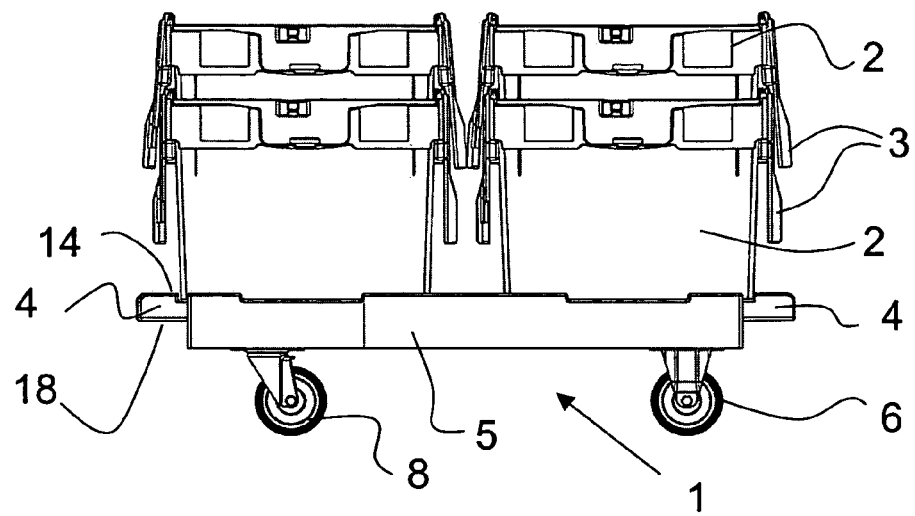
FIG. 3 shows a side view of a transport dolly of the present invention loaded with two stacks of open mutually stacked transport boxes whose top covers are flipped downwardly on the sides.

FIG. 3 shows a transport dolly 1 of the present invention loaded with two stacks of open, mutually stacked, transport boxes 2. The top covers 3 of the mutually stacked transport boxes 2 are flipped outwardly and downwardly to the side. The width of the individual stacks is increased by the downwardly flipped top covers 3, compared to the stacks of closed transport boxes 2. The stacks of open, mutually stacked transport boxes therefore also require a larger floor area on the upper side of the support floor 5. For this purpose, the additional elements 4 on the support floor 5 of the transport dolly 1 are flipped outwardly on the side. The transport dolly 1 is extended in length by outwardly flipping the additional elements 4 and the floor space is thus also enlarged. The size of the additional elements 4 is chosen in such a way that, on the one hand, two stacks of open, mutually stacked transport boxes 2 can be positioned in a contact-free manner on the enlarged support surface and, on the other hand, the overall length of the transport dolly is larger than the overall width of the two stacks of transport boxes. This means that the transport boxes 2 and their top covers 3 will not project over the transport dolly 1. As a result, when two or more transport dollies 1 hit each other, the impact is absorbed by the support floors 5 and the additional elements 4, and the transport boxes 3 and their top covers 3 are not damaged. In the example illustrated in FIG. 3, guide rollers 8 are arranged on the left side and fixed rollers 6 are arranged on the right side on the lower surface of the support floor 5.

Figure 4:
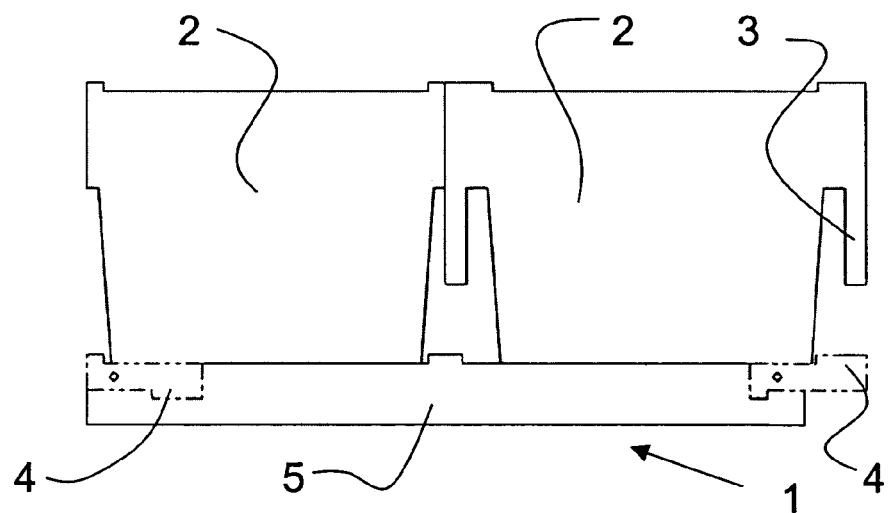
FIG. 4 shows a schematic representation of a support floor of the present invention, loaded with an open and a closed transport box.

FIG. 4 shows a schematic representation of a support floor 5 which is loaded with two transport boxes 2, and in which the additional element 4 on the right is flipped out and the additional element 4 on the left is flipped in. In the right transport box 2, the top covers 3 are flipped downwardly on the side, as a result of which the box requires a larger floor area than the left box whose top covers are closed. The larger floor area required by the right box 2 is achieved by flipping out the right additional element 4. The left box 2 has sufficient space on the support surface without an opened additional element 4. The flipping out of the additional elements 4 on one or both sides ensures a flexible handling of the transport dolly 1. The floor area can thus be adjusted according to the requirements. As a result, both only opened and only closed, as well as opened and closed, transport boxes 2 can be placed on the support floor 5 in a stacked manner.

Figure 5:
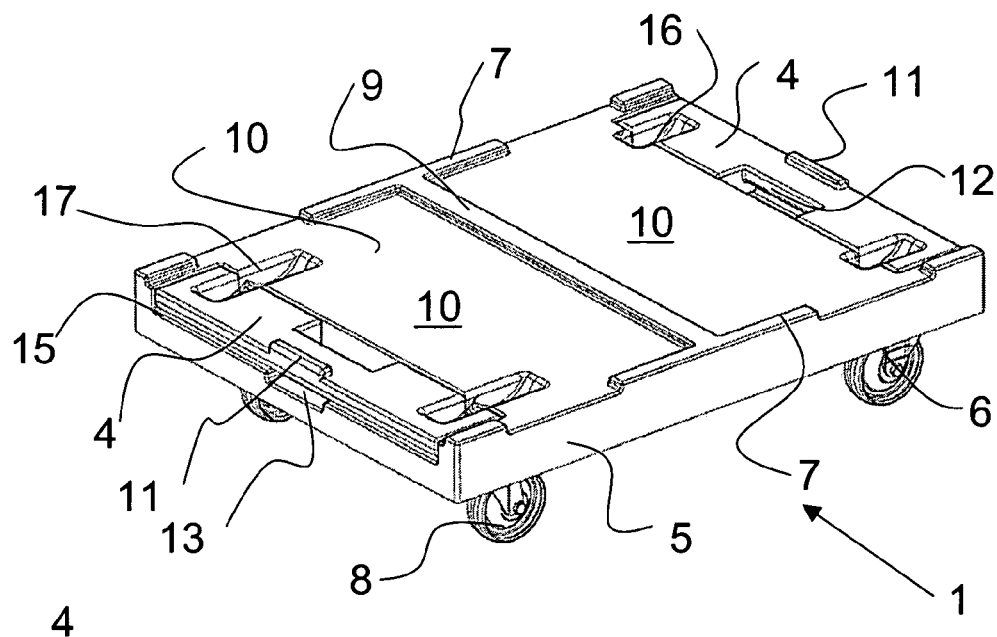
FIG. 5 shows a perspective representation of a transport dolly of the present invention with additional elements that are flipped inwardly.

FIG. 5 shows a perspective view of an unloaded transport dolly 1 with retracted additional elements 4. Fixed wheels 6 on the right and guide rollers 8 on the left are arranged on the lower side of the integrally shaped support floor 5. The castors of the guide rollers are rotatable about their vertical axis, whereby the transport dolly 1 can be steered and controlled with ease when displaced. Upwardly projecting stop edges 7 are provided on both longitudinal sides of the support floor 5 on the upper side. In the illustrated example, an additional stop edge 9 extends in the center of the support floor 5 parallel to the transverse side of the transport dolly 1. The support floor 5 is provided with cuboid-shaped recesses 15 at its transverse ends for receiving the additional elements 4. The additional elements 4 are hinge-fixed laterally by means of bolts in the recesses 15 of the support floor 5. These hinges are not shown in the drawing. The thickness of the additional element 4 corresponds to the thickness of the recess 15 so that, in the case of retracted additional element 4, the recess 15 is filled in the support floor 5 and the upper side of the additional element forms a part of the support surface 10. A nose, or protrusion, 11 is shaped at the upper outer edge of the additional element 4 which acts as a lateral stop edge. Said protrusion 11 forms a frame with the lateral stop edges 7 and the transversal edge 9, which subdivides the support surface 10 of the transport dolly 1 into two halves. The support surface 10 within the stop edges 7, 9 and 11 corresponds approximately to the floor surface of the transport boxes 2. During loading of the transport dolly 1, the transport boxes 2 are positioned and centered in a slip-free manner within the stop edges 7, 9 and 11. A recess is provided in the center of the additional elements 4 which forms a handle 12. Said handle 12 eases the carrying, handling and stacking of the empty transport dolly 1. The support floor 5 comprises a recess 13 in the middle of the transverse side below the additional element 4. Said recess 13 corresponds to the protrusion 11 in respect of shape and size. When the additional elements 4 are flipped out, the protrusion 11 hits the support floor 5 within the recess 13 and thus prevents the additional elements 4 from being twisted too far.

Figure 6:
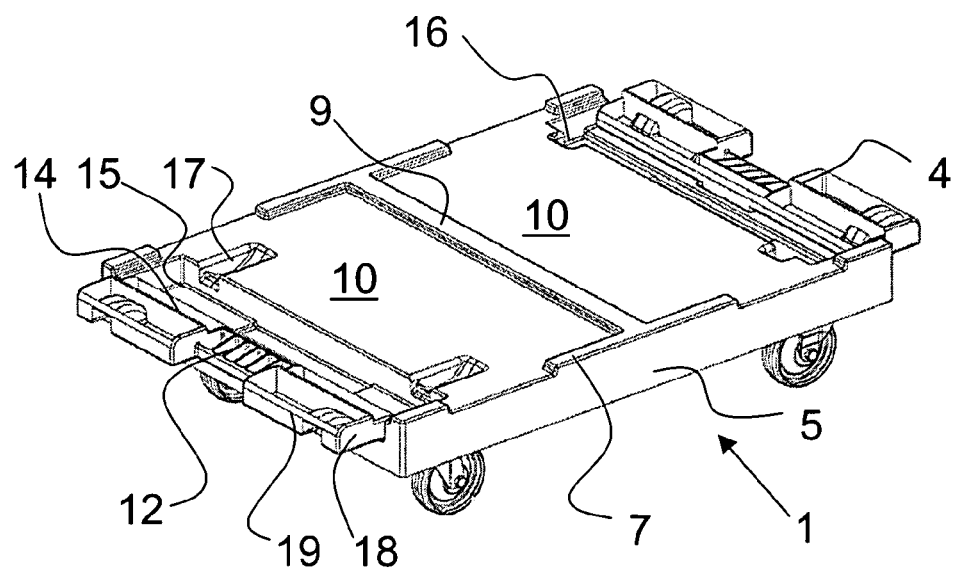
FIG. 6 shows a perspective representation of a transport dolly of the present invention with additional elements that are flipped outwardly.

A transport dolly 1 with extended additional elements 4 is shown in a perspective representation in FIG. 6. The recess forming the handle 12 can be seen in the center of the extended additional element 4. The lower side of the additional element 4, which faces upward when the additional element 4 is extended, is provided with a graduation. This graduation extends parallel to the transverse side of the transport dolly 1 and forms a lateral stop edge 14, which prevents the lateral slippage of transport boxes stacked on the transport dolly 1. When stacking open, mutually stacked transport boxes 2, the boxes are pushed on the bearing surface 10 up to the lateral stop edge 14, as shown in FIG. 3. The width of the additional elements 4 is chosen in such a way that the portion 18 projecting laterally beyond the transport dolly 1 is larger than the partial surface of transport boxes 2 which projects perpendicularly on the additional element 4, when the transport boxes are stacked on the transport dolly 1. Thus, when transport dollies 1 touch each other, only their longitudinal sides or the front edges 19 of the additional elements 4 come into contact, and not the stacked transport boxes 2 or their laterally extended top covers 3, thereby protecting the stacked transport boxes 2 during the displacement and moving.

In the corner regions of support floor 5 in which the wheels 6 are arranged on the lower side, the bearing surfaces 10 and the additional elements 4 are provided with recesses which are shaped as wheel troughs 16, 17. The slot-like wheel troughs 16, 17 extend parallel to the longitudinal side of the transport dolly 1 and are arranged in a rectangular manner in a top view. They have a width which is slightly larger than the width of wheels and guide rollers 6, 8. When empty transport dollies 1 are stacked above one another, the wheels 6 of a transport dolly 1 stacked on a bearing surface 10 come to lie in the wheel troughs 16, 17 of a transport dolly 1 positioned below. At least one of the four wheels is held in a wheel trough 16 in a positive-locking manner, which ensures that the transport dollies 1 cannot roll off or slide down the bearing surface. In this way the transport dollies 1 can be stacked and stored in a compact manner.

Figure 7:
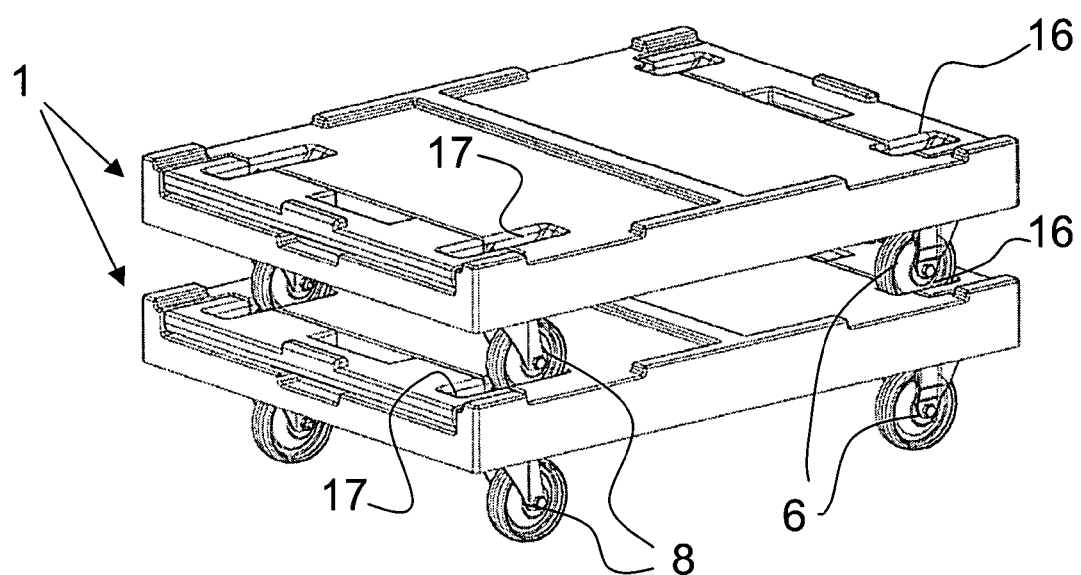
FIG. 7 shows a perspective representation of two transport dollies of the present invention stacked above each other.

FIG. 7 shows two transport dollies 1 stacked above one another in a perspective representation. The wheels 6 of the upper transport dolly 1 lie in the wheel troughs 16, 17 of the lower transport dolly 1. The left wheels are the guide rollers 8 which are rotatable about their vertical axis. As a result of their eccentric vertical axis, the guide rollers 8 can assume two different positions when aligned parallel to the longitudinal side of the transport dolly 1, namely a forward motion and a rearward motion position. In order to enable the stacking of the transport dolly 1 regardless of the position of the guide rollers 8, the wheel troughs 17 are configured at the front side of the transport dolly 1 in such a way that the guide rollers 8 fit into the wheel troughs 17 both in the forward motion as well as the rearward motion position. The transport dollies 1 are each stacked so that the guide rollers 8 lie in the front wheel troughs 17. The rear wheels 6 are held in the rear wheel troughs 16 in a positive-locking manner, whereby the transport dolly 1 is unable to roll off the bearing surface. In this way the stacked transport dollies are always aligned in the same manner, which is advantageous during further handling and loading of the transport dollies 1.

We claim:

1. transport dolly for moving at least one stackable transport box, the dolly comprising:

(a) a substantially rectangular support floor having a bearing surface for receiving the transport box, the support floor being movable on wheels;
   (b) at least one anti-slip device positioned on the bearing surface of the support floor to prevent movement of a transport box positioned on the bearing surface, the at least one anti-slip device comprises an upwardly projecting stop edge provided on an upper edge of a longitudinal side of the support floor; and
   (c) at least one extendable additional element hingeably attached to a transverse end of the support floor, wherein the additional element can be flipped outward by 180° to provide an enlargement of the bearing surface of the support floor.

2. The transport dolly of claim 1, wherein the dolly comprises two extendable elements hingeably attached to opposing transverse ends of the support floor.

3. The transport dolly of claim 1, wherein the support floor is provided with at least one cuboid recess positioned at the transverse end for receiving the additional element.

4. The transport dolly of claim 3, wherein the additional element is hingeably attached to the support floor by means of at least one bolt positioned in the recess of the support floor.

5. The transport dolly of claim 3, wherein the thickness of the additional element corresponds to the thickness of the recess, whereby, when the additional element is retracted, the recess in the support floor is filled and an upper side of the additional element forms a part of the bearing surface.

6. The transport dolly of claim 1, further comprising a protrusion provided on an upper outer edge of the additional element, wherein the protrusion acts as a lateral stop edge.

7. The transport dolly of claim 6, further comprising a recess positioned at the center of the transverse side below the additional element, the recess corresponding in shape and size to the protrusion and being able to hold the protrusion in a locked position when the additional element is extended.

8. The transport dolly of claim 1, wherein two wheels are provided adjacent to the transverse side of the transport dolly, the two wheels being guide rollers, each of the guide rollers having a coaster axis which extends eccentrically to a vertical axis about which the guide rollers are rotatable.

9. The transport dolly of claim 1, further comprising slot-like recesses provided in the support floor and in the additional element, the slot-like recesses extending parallel to a longitudinal side of the transport dolly, and being sized and shaped to receive the wheels of a second transport dolly when the second transport dolly is positioned on the support floor of the transport dolly.

10. The transport dolly of claim 9, wherein at least one of the slot-like recesses is able to hold at least one wheel of the second transport dolly in a lockable manner.

11. Transept dolly of claim 1 further comprising a recess provided in the center of the additional element, the recess forming a handle.

* * * * *